United States Patent
Yokota et al.

(10) Patent No.: US 10,854,396 B2
(45) Date of Patent: Dec. 1, 2020

(54) PACKAGING MATERIAL FOR ELECTROCHEMICAL CELLS

(71) Applicants: DAI NIPPON PRINTING CO., LTD., Tokyo (JP); NIHON PARKERIZING CO., LTD., Tokyo (JP)

(72) Inventors: Kazuhiko Yokota, Tokyo (JP); Rikiya Yamashita, Tokyo (JP); Yasuhiko Nagashima, Tokyo (JP)

(73) Assignees: DAI NIPPON PRINTING CO., LTD., Tokyo (JP); NIHON PARKERIZING CO., LTD., Tokyo (JP)

(*) Notice: Subject to any disclaimer, the term of this patent is extended or adjusted under 35 U.S.C. 154(b) by 102 days.

(21) Appl. No.: 16/087,848

(22) PCT Filed: Mar. 21, 2017

(86) PCT No.: PCT/JP2017/011267
§ 371 (c)(1),
(2) Date: Sep. 24, 2018

(87) PCT Pub. No.: WO2017/164188
PCT Pub. Date: Sep. 28, 2017

(65) Prior Publication Data
US 2019/0180951 A1    Jun. 13, 2019

(30) Foreign Application Priority Data
Mar. 22, 2016   (JP) ................... 2016-057661

(51) Int. Cl.
*H01G 11/78* (2013.01)
*H01M 2/08* (2006.01)
(Continued)

(52) U.S. Cl.
CPC ............. *H01G 11/78* (2013.01); *B32B 15/08* (2013.01); *H01M 2/0207* (2013.01);
(Continued)

(58) Field of Classification Search
CPC ...... H01G 11/78; H01M 2/08; H01M 2/0277; H01M 2/0292; B32B 15/08
(Continued)

(56) References Cited

U.S. PATENT DOCUMENTS

2014/0255765 A1* 9/2014 Akita ................. B32B 15/20
429/176

FOREIGN PATENT DOCUMENTS

| JP | 2004-95543 A | 3/2004 |
| JP | 2005-063685 A | 3/2005 |

(Continued)

OTHER PUBLICATIONS

May 16, 2017 International Search Report issued in International Patent Application No. PCT/JP2017/011267.

*Primary Examiner* — Arun Ramaswamy
(74) *Attorney, Agent, or Firm* — Oliff PLC (57) ABSTRACT

A packaging material for electrochemical cells, which has insulating properties sufficient for preventing a short circuit, while exhibiting excellent electrolyte solution resistance and water vapor barrier properties. A packaging material for electrochemical cells is obtained by sequentially laminating a metal layer, an adhesive resin layer and a thermally adhesive resin layer in this order, wherein: a base coating layer is provided between the metal layer and the adhesive resin layer; and the base coating layer contains at least a zirconium oxide (A) having an average particle diameter within the range of from 1 nm to 500 nm (inclusive), one or more phosphorus-containing compounds (B) selected from the group of phosphorus compounds having 4 or more phosphonic groups in each molecule, and an acid-modified polyolefin resin (C).

6 Claims, 2 Drawing Sheets

(51) Int. Cl.
*H01M 2/02* (2006.01)
*B32B 15/08* (2006.01)

(52) U.S. Cl.
CPC ....... *H01M 2/0275* (2013.01); *H01M 2/0277* (2013.01); *H01M 2/0287* (2013.01); *H01M 2/0292* (2013.01); *H01M 2/08* (2013.01); *Y02E 60/13* (2013.01)

(58) Field of Classification Search
USPC ............... 361/517, 535, 502, 503, 518, 519; 429/174, 175, 176
See application file for complete search history.

(56) References Cited

FOREIGN PATENT DOCUMENTS

| | | | |
|---|---|---|---|
| JP | 2007-157412 A | | 6/2007 |
| JP | 2007-157615 A | | 6/2007 |
| JP | 2015134957 A | * | 7/2015 |

* cited by examiner

PACKAGING MATERIAL FOR ELECTROCHEMICAL CELLS

TECHNICAL FIELD

The present invention relates to an electrochemical cell packaging material, particularly to an electrochemical cell packaging material having insulating properties sufficient for short circuit prevention as well as excellent resistance to electrolyte liquid and excellent water vapor barrier properties.

BACKGROUND ART

A lithium-ion cell is also called a lithium secondary cell and includes electrolyte liquid in the form of liquid, gel or macromolecule polymer and cathode and anode active materials. The lithium-ion cell includes: a lithium-ion cell module composed of a cathode charge collector/a cathode active material layer/an electrolyte liquid layer/an anode active material layer/an anode charge collector; and a packaging member for packaging these. The packaging member is formed from an electrochemical cell packaging material (hereinafter also simply called "packaging material") made of a multi-layered film.

Figure 4:
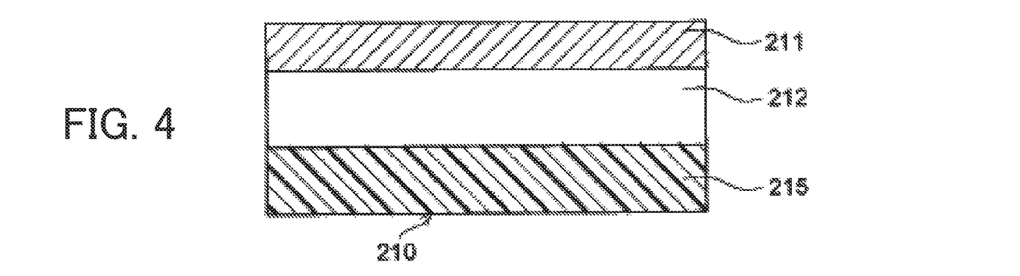
FIG. 4 is a cross-sectional view showing a layer structure of a conventional electrochemical cell packaging material.

FIG. 4 shows a cross-sectional view for showing a layer structure of a conventional electrochemical cell packaging material. As shown in FIG. 4, a conventional electrochemical cell packaging material 210 is composed of at least a base layer 211, a metal layer 212 and a thermally adhesive resin layer 215 that are sequentially stacked.

Cell packaging members made of such a packaging material are classified into two types. One is a pouch type packaging member that is obtained by processing the packaging material into a pouched form so that a cell module is accommodated in the pouch, and the other is an embossing type packaging member that is obtained by stamping the packaging material to form a recess so that a cell module is accommodated in the recess. In either type, a cell module is placed inside the cell packaging member, and the thermally adhesive resin layers 215 are superposed on each other and heat-sealed, whereby the cell module is accommodated inside the cell packaging member.

Figure 5:
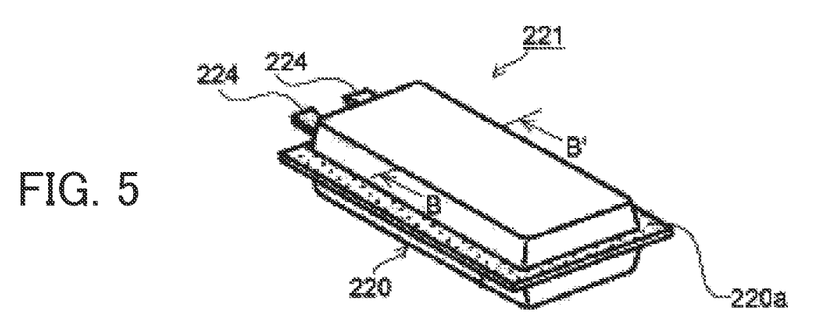
FIG. 5 is a perspective view showing a lithium-ion cell having a packaging member formed from the conventional electrochemical cell packaging material.
Figure 6:
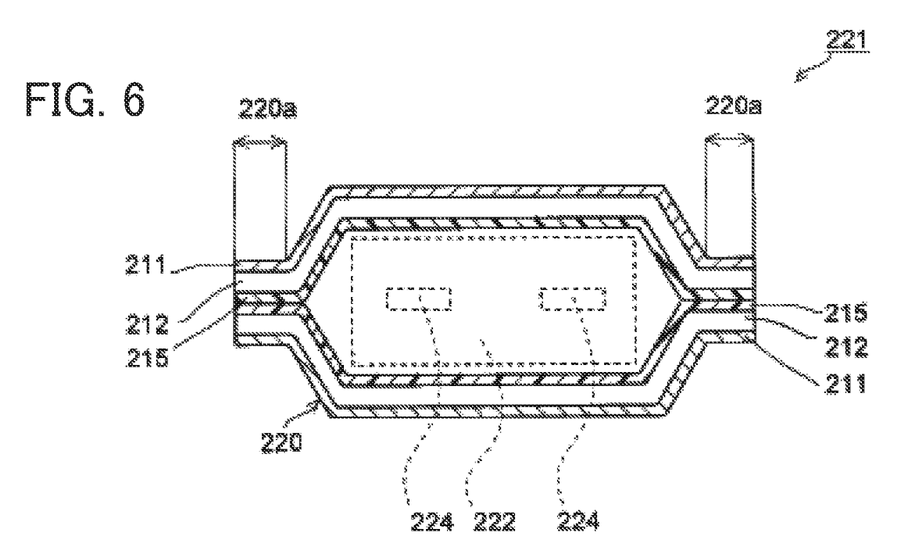
FIG. 6 is a view showing a cross-sectional structure along line B-B' of the lithium-ion cell shown in FIG. 5.

FIG. 5 shows a perspective view of a conventional lithium-ion cell 221 of embossing type, and FIG. 6 is a view showing a cross-sectional structure along line B-B' of the lithium-ion cell 221 of FIG. 5. As shown in FIGS. 5 and 6, metal terminals 224 extending from a lithium-ion cell module 222 to the outside of a packaging member 220 are sandwiched between the thermally adhesive resin layers 215 in the packaging member 220, and a packaging member peripheral edge 220a is heat-sealed (hereinafter the portion where heat-sealing has been applied is called "heat-sealed portion 220a"), whereby the lithium-ion cell module 222 is accommodated inside the packaging member 220.

Meanwhile, prolonged use or rapid charging of the lithium-ion cell 221 may cause the lithium-ion cell module 222 to produce heat, which melts part of the thermally adhesive resin layers 215 in contact with the lithium-ion cell module 222, and consequently, electrolyte liquid filling the inside of the packaging member 220 penetrates into either metal layer 212, resulting in a short circuit between the lithium-ion cell module 222 and the metal layer 212. In addition, in heat-sealing of the packaging member peripheral edge 220a, if part of a separator included in the lithium-ion cell module 222 or an electrode active material peeled off from an electrode is caught and stuck in the heat-sealed portion 220a, the part of the separator or the electrode active material peeled off from the electrode may come into contact with the metal layer 212, resulting in a short circuit. Further, in cases where the metal terminals 224 extending from the lithium-ion cell module 222 to the outside of the packaging member 220 are sandwiched between the thermally adhesive resin layers 215 in the packaging member 220 and the packaging member peripheral edge 220a is heat-sealed with the metal terminals 224 having a burr, a short circuit may also occur between the relevant metal terminal 224 and the metal layer 212.

To cope with these problems, a packaging material in which a heat-resistant resin layer having excellent heat resistance, such as polyethylene terephthalate, is interposed between the metal layer 212 and the thermally adhesive resin layer 215 has conventionally been proposed. Patent Literature 1 proposes a packaging material in which an aluminum foil layer, which is one example of the metal layer 212, and a thermoplastic resin film, which is one example of the thermally adhesive resin layer 215, are bonded with an adhesive composition containing polyolefin polyol and a polyfunctional isocyanate curing agent as its essential ingredients.

CITATION LIST

Patent Literature

Patent Literature 1: JP 2005-63685 A

SUMMARY OF INVENTION

Technical Problems

When, however, a heat-resistant resin layer is interposed between the metal layer 212 and the thermally adhesive resin layer 215, an adhesive layer needs to be interposed between the metal layer 212 and the heat-resistant resin layer to bond those layers. In addition, when such an adhesive layer is provided, a steam gas coming from the end surface of the adhesive layer may penetrate to the inside of the packaging member 220 and react with the electrolyte liquid, causing generation of a hydrogen fluoride gas. Likewise, in the packaging material described in Patent Literature 1, a steam gas coming from the end surface of a layer made from the aforementioned adhesive composition may penetrate to the inside of the packaging member 220 and react with the electrolyte liquid, causing generation of a hydrogen fluoride gas. Therefore, a packaging material has been required to also have excellent water vapor barrier properties.

Besides, a packaging material has also been required to keep excellent adhesion between the metal layer 212 and the thermally adhesive resin layer 215 when the packaging material makes contact with electrolyte liquid, i.e., required to have excellent resistance to electrolyte liquid (hereinafter also called "electrolyte resistance").

In view of the problems above, an object of the present invention is to provide an electrochemical cell packaging material having insulating properties sufficient for short circuit prevention as well as excellent electrolyte resistance and water vapor barrier properties.

Solution to Problems

The present invention is as follows:
(1) An electrochemical cell packaging material having a metal layer, an adhesive resin layer and a thermally adhesive resin layer that are stacked in this order, the electrochemical cell packaging material comprising:

an underlying coating layer disposed between the metal layer and the adhesive resin layer, wherein the underlying coating layer at least contains a zirconium oxide (A) having an average particle size in a range from not less than 1 nm to not more than 500 nm, one or more phosphorus-containing compounds (B) selected from the group of phosphorus compounds each having four or more phosphonic groups in a molecule, and an acid-modified polyolefin resin (C).

(2) The electrochemical cell packaging material according to (1) above, wherein a content of the zirconium oxide (A) is in a range from not less than 3 mass % to not more than 54 mass % with respect to total solids of the underlying coating layer.

(3) The electrochemical cell packaging material according to (1) or (2), wherein a content of the acid-modified polyolefin resin (C) is in a range from not less than 24 mass % to not more than 96 mass % with respect to total solids of the underlying coating layer.

Advantageous Effects of Invention

The present invention can provide an electrochemical cell packaging material having insulating properties sufficient for short circuit prevention as well as excellent electrolyte resistance and water vapor barrier properties.

DETAILED DESCRIPTION OF THE INVENTION

The electrochemical cell packaging material of the present invention is described below by reference to drawings. Note that description is omitted for the same portions as those of the conventional example shown in FIGS. 4 to 6.

Figure 1:
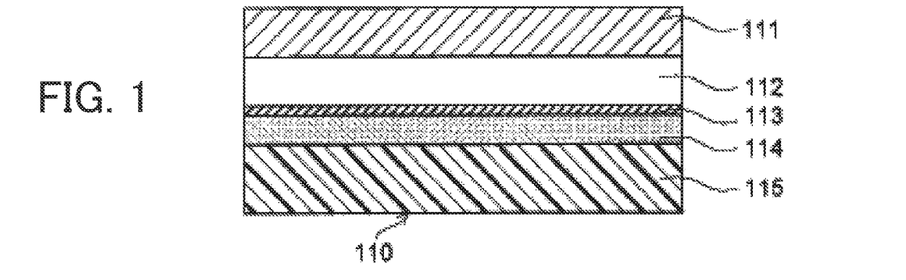
FIG. 1 is a cross-sectional view showing one example of a layer structure of an electrochemical cell packaging material of the invention.

FIG. 1 is a cross-sectional view showing a layer structure of an electrochemical cell packaging material that is one exemplary embodiment of the invention. As shown in FIG. 1, an electrochemical cell packaging material 110 according to the embodiment is composed of a base layer 111, a metal layer 112, an adhesive resin layer 114 and a thermally adhesive resin layer 115 that are sequentially stacked. An underlying coating layer 113 is formed between the metal layer 112 and the adhesive resin layer 114, e.g., on the surface of the metal layer 112 on the adhesive resin layer 114 side. The electrochemical cell packaging material 110 of the invention may further include one or two or more different layers in addition to the foregoing layers. Such a different layer may be disposed between two of the foregoing layers, or on the whole or part of, for instance, the surface of the base layer 111 on the opposite side from the metal layer 112 or the surface of the thermally adhesive resin layer 115 on the opposite side from the adhesive resin layer 114.

Figure 2:
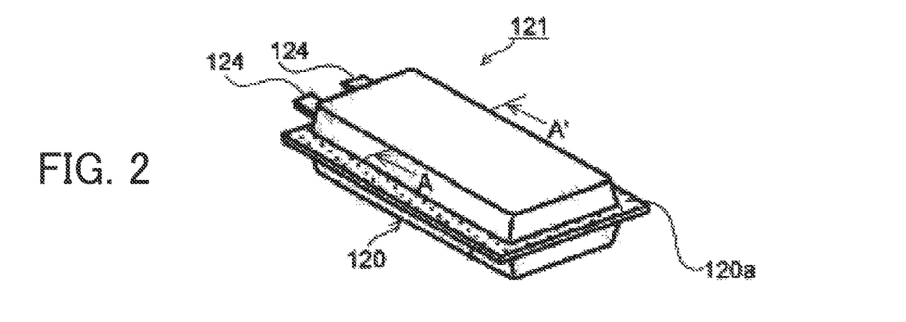
FIG. 2 is a perspective view showing one example of a lithium-ion cell having a packaging member formed from the electrochemical cell packaging material of the invention.
Figure 3:
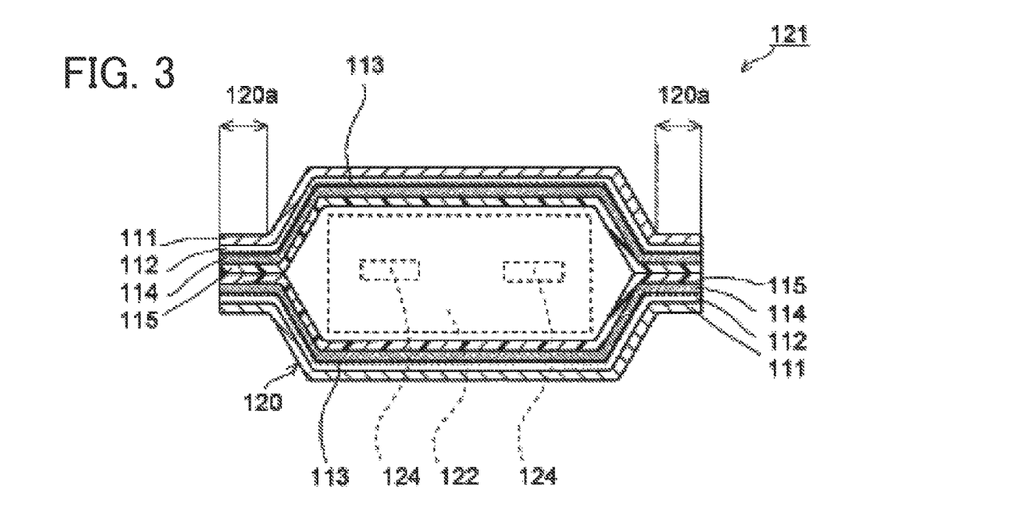
FIG. 3 is a view showing a cross-sectional structure along line A-A' of the lithium-ion cell shown in FIG. 2.

FIG. 2 shows a perspective view of a lithium-ion cell 121 having a pouch type packaging member 120 formed from the electrochemical cell packaging material 110, and FIG. 3 is a view showing a cross-sectional structure along line A-A' of the lithium-ion cell 121 of FIG. 2. As shown in FIGS. 2 and 3, with metal terminals 124 being held in the packaging member 120, the peripheral edge of the packaging member 120 including portions where the metal terminals 124 are sandwiched is heat-sealed, and a lithium-ion cell module 122 including electrolyte liquid is accommodated inside the packaging member 120.

The underlying coating layer 113 formed on the surface of the metal layer 112 has a function as an insulating layer, and even when parts of the adhesive resin layer 114 and the thermally adhesive resin layer 115 are melted due to heat generation of the lithium-ion cell module 122, the underlying coating layer 113 does not melt. Accordingly, even when the electrolyte liquid penetrates up to the underlying coating layer 113 through melted parts of the adhesive resin layer 114 and the thermally adhesive resin layer 115, the electrolyte liquid is blocked by the underlying coating layer 113 so that the metal layer 112 and the lithium-ion cell module 122 are not electrically connected to each other. Thus, a short circuit is prevented from occurring in the lithium-ion cell 121.

Even when, in a heat-sealed portion 120a, a burr generated on the metal terminal 124 is caught and stuck in the adhesive resin layer 114 and the thermally adhesive resin layer 115 during heat-sealing, a short circuit caused by electrical connection between the metal terminal 124 and the metal layer 112 can be prevented from occurring in the present invention. In addition, since the underlying coating layer 113 itself has low water vapor permeability, the electrochemical cell packaging material 110 has excellent water vapor barrier properties, accordingly. In addition, the adhesion between the underlying coating layer 113 and the adhesive resin layer 114 does not vary for a long time, so that high lamination strength is provided between the underlying coating layer 113 and the adhesive resin layer 114. In addition, the adhesion between the underlying coating layer 113 and the adhesive resin layer 114 is also stable with respect to the electrolyte liquid, and accordingly, a decrease in the lamination strength between the underlying coating layer 113 and the adhesive resin layer 114 due to the influence of the electrolyte liquid is small.

Although not illustrated, the underlying coating layer 113 may be formed on the surface of the metal layer 112 on the base layer 111 side. Owing to the configuration in which the underlying coating layer 113 is formed on the surface of the metal layer 112 on the base layer 111 side, even when a plurality of lithium-ion cells 121 are stacked for use and a certain lithium-ion cell 121 discharges, insulating properties of an adjacent lithium-ion cell 121 can be ensured.

The underlying coating layer 113 is described below in detail. It should be noted that the invention may arbitrarily be modified as far as the gist thereof is included and the invention is by no means limited to the following embodiments.

[Underlying Coating Layer]

The underlying coating layer 113 at least contains: a zirconium oxide (A) having an average particle size in a range from not less than 1 nm to not more than 500 nm; one or more phosphorus-containing compounds (B) selected from the group of phosphorus compounds each having four or more phosphonic groups in the molecule; and an acid-modified polyolefin resin (C).

The constituent components of the underlying coating layer 113 and the formation method of the underlying coating layer 113 are described below in detail.

The underlying coating layer 113 is a coating formed from an underlying coating-forming agent that at least contains: a zirconium oxide (A) having an average particle size in a range from not less than 1 nm to not more than 500 nm; one or more phosphorus-containing compounds (B) selected from the group of phosphorus compounds each having four or more phosphonic groups in the molecule; and an acid-modified polyolefin resin (C). The formation method thereof involves a step of contacting the underlying coating-forming agent with a surface of the metal layer 112 (contacting step) and a step of drying the metal layer 112 having been contacted with the underlying coating-forming agent, without rinsing with water (drying step). In the formation method of the underlying coating layer 113, the contacting step may be preceded by a pretreatment step in which the metal layer 112 is, for instance, degreased or pickled in advance.

(Zirconium Oxide)

An example of the zirconium oxide (A) is a zirconium oxide having an average particle size in a range from not less than 1 nm to not more than 500 nm. One specific example thereof is a zirconium (IV) oxide ($ZrO_2$).

The underlying coating layer 113 may contain a zirconium (IV) hydroxide ($Zr(OH)_2$)

Preferably, the zirconium oxide (A) is used in a form where solid particles thereof are dispersed in an aqueous medium (e.g., a form of sol). This dispersion solution can be handled more easily than the solid particles of the zirconium oxide (A) present without being dispersed, thus facilitating the production of the underlying coating-forming agent.

The dispersion solution above can be produced by a known method.

The aqueous medium is a medium containing not less than 50 mass % of water. Exemplary solvents that may be contained in the aqueous medium other than water include: alkane solvents such as hexane and pentane; aromatic solvents such as benzene and toluene; alcoholic solvents such as ethanol, 1-butanol and ethyl cellosolve; ether solvents such as tetrahydrofuran and dioxane; ester solvents such as ethyl acetate and butoxyethyl acetate; amide solvents such as dimethylformamide and N-methyl pyrrolidone; sulfone solvents such as dimethyl sulfoxide; and phosphoric amide solvents such as hexamethyl phosphoric triamide. These solvents other than water may be used alone or in combination of two or more.

The zirconium oxide (A) content of the underlying coating layer 113 is not particularly limited and is preferably in a range from not less than 1 mass % to not more than 60 mass % with respect to the total solids of the underlying coating layer 113 (the coating mass in a dry state). In particular, the content is more preferably not less than 3 mass % because the electrochemical cell packaging material 110 can have more excellent electrolyte resistance, and more preferably not more than 54 mass % because the electrochemical cell packaging material 110 can have more excellent water vapor barrier properties.

The average particle size of the zirconium oxide (A) in the underlying coating layer 113 is in a range from not less than 1 nm to not more than 500 nm. In particular, the average particle size is preferably in a range from not less than 5 nm to not more than 200 nm and more preferably in a range from not less than 10 nm to not more than 100 nm because the electrochemical cell packaging material 110 can have more excellent electrolyte resistance.

The average particle size of the zirconium oxide (A) in the underlying coating layer 113 can be determined by, for instance, observing the surface or cross section of the underlying coating layer 113 with a scanning electron microscope (SEM), field emission scanning electron microscope (FE-SEM), transmission electron microscope (TEM) or field emission transmission electron microscope (FE-TEM) equipped with an energy-dispersive X-ray spectrometer (EDS). More specifically, the average particle size of the zirconium oxide (A) can be determined by, through EDS analysis, identifying particles containing Zr and O within a field-of-view region of the underlying coating layer 113 observed with FE-SEM, measuring the particle sizes of ten particles randomly selected from the identified particles (the particle size refers to the long diameter if there are the long diameter and the short diameter), and calculating the average of the measured particle sizes.

(Phosphorus-Containing Compound)

The phosphorus-containing compound (B) is not particularly limited as long as it is a phosphorus compound having four or more phosphonic groups ($-P(=O)(OH)_2$) in the molecule, and specific examples thereof include: phytic acids and salts thereof (e.g., ammonium salts, sodium salts, calcium salts, magnesium salts, lithium salts); and ethylenediamine tetra(methylene phosphonic acids) and salts thereof (e.g., ammonium salts, sodium salts, calcium salts, magnesium salts, lithium salts). These phosphorus compounds may be used alone or in combination of two or more.

The phosphorus-containing compound (B) content of the underlying coating layer 113 is not particularly limited, and the ratio (P/Zr) of the total molar quantity of phosphorus atoms (P) in the phosphorus-containing compound (B) to the total molar quantity of zirconium atoms (Zr) in the zirconium oxide (A) is preferably in a range from not less than 0.01 to not more than 5.0 and more preferably in a range from not less than 0.1 to not more than 2.0 for the sake of initial adhesion between the underlying coating layer 113 and the adhesive resin layer 114 and electrolyte resistance of the electrochemical cell packaging material 110.

(Acid-Modified Polyolefin Resin)

For the acid-modified polyolefin resin (C), known acid-modified polyolefin resins are applicable.

The acid-modified polyolefin resin (C) may be of water-soluble type or water-dispersible type (an emulsion or a dispersion). The acid-modified polyolefin resin (C) may be any of cationic, nonionic and anionic resins as long as the stability of the underlying coating-forming agent is not impaired.

Examples of the acid-modified polyolefin resin (C) include an acid-modified polyolefin resin obtained by modifying a polyolefin, such as polypropylene, polyethylene, or a copolymer of propylene, ethylene and α-olefin, with an unsaturated carboxylic acid or an anhydride thereof. The acid-modified polyolefin resin may be copolymerized with a small amount of another ethylenically unsaturated monomer. One exemplary method of dissolving or dispersing the acid-modified polyolefin resin (C) into water is neutralizing carboxyl groups included in the acid-modified polyolefin resin (C) with ammonia or an amine.

For the unsaturated carboxylic acids and anhydrides thereof, known substances are applicable. Specific examples thereof include acrylic acid, methacrylic acid, maleic acid, maleic anhydride, itaconic acid, itaconic anhydride, fumaric acid and crotonic acid, as well as a half-ester of unsaturated dicarboxylic acid and a half-amide thereof. Of these, acrylic acid, methacrylic acid, maleic acid and maleic anhydride are preferred, and acrylic acid and maleic anhydride are more preferred. The unsaturated carboxylic acids and anhydrides thereof are not limited as long as they are copolymerized with a polyolefin. The form of the copolymerization is not particularly limited, and examples thereof include random copolymerization, block copolymerization and graft copolymerization (graft modification). In cases where an anhydride of an unsaturated carboxylic acid is introduced into a polyolefin, adjacent carboxyl groups are cyclodehydrated to form an acid anhydride structure in a dry state of the resin, and when the resin is dispersed into water, a part or whole of the acid anhydride structure is hydrolyzed to take on the structure of a carboxyl group or its salt.

The acid-modified polyolefin resins (C) as above may be used alone or in combination of two or more.

The acid-modified polyolefin resin (C) content of the underlying coating layer 113 is not particularly limited and is preferably in a range from not less than 5 mass % to not more than 98 mass % with respect to the total solids of the underlying coating layer 113 (the coating mass in a dry state). In particular, the content is more preferably not less than 24 mass % because the electrochemical cell packaging material 110 can have more excellent water vapor barrier properties, and more preferably not more than 96 mass % because the electrochemical cell packaging material 110 can have more excellent electrolyte resistance.

(Others)

The underlying coating layer 113 and the underlying coating-forming agent may contain other components than the zirconium oxide (A), the phosphorus-containing compound (B) and the acid-modified polyolefin resin (C) described above.

For instance, the underlying coating-forming agent may optionally contain various solvents for the sake of workability at the time of bringing the agent into contact with a surface of the metal layer 112. Exemplary solvents include: water; alkane solvents such as hexane and pentane; aromatic solvents such as benzene and toluene; alcoholic solvents such as ethanol, 1-butanol and ethyl cellosolve; ether solvents such as tetrahydrofuran and dioxane; ester solvents such as ethyl acetate and butoxyethyl acetate; amide solvents such as dimethylformamide and N-methyl pyrrolidone; sulfone solvents such as dimethyl sulfoxide; and phosphoric amide solvents such as hexamethyl phosphoric triamide. Use may be made of, of these, one solvent or two or more solvents in combination.

Other than the foregoing components, the underlying coating-forming agent may contain such additives as a resin, a surfactant, an antifoaming agent, a leveling agent, a crosslinking agent, a plasticizer, an antimicrobial agent, a mold inhibitor and a colorant, as long as the spirit of the invention and the quality of the underlying coating layer 113 formed from the underlying coating-forming agent are not impaired.

Exemplary antifoaming agents include mineral antifoaming agents, fatty acid antifoaming agents and silicone antifoaming agents.

Exemplary leveling agents include nonionic or cationic surfactants, adducts of polyethylene oxide or polypropylene oxide of polyacetylene glycol, and known compounds such as an acetylene glycol compound.

The crosslinking agent is not particularly limited as long as it is bonded to the zirconium oxide (A) and the acid-modified polyolefin resin (C) to make a strong underlying coating layer 113, and examples thereof include melamine resins, blocked isocyanates, epoxy compounds, amines, polyhydric alcohols, polyhydric phenols, polyvalent carboxylic acids, hydroxycarboxylic acids, phosphoric acids or phosphoric acid compounds (excluding the phosphorus-containing compound (B)), and polyvalent metal compounds. When the crosslinking agent is used, a curing catalyst may further be used as appropriate in order to accelerate crosslinking.

For the melamine resin, known melamine resins may be used. Specific examples thereof include a fully alkylated type melamine resin represented by Formula (1) below, a methylol group type melamine resin in which at least one of $(ROCH_2)_2N-$ groups in Formula (1) is substituted with a group represented by Formula (2), an imino group type melamine resin in which at least one of $(ROCH_2)_2N-$ groups in Formula (1) is substituted with a group represented by Formula (3), and a methylol/imino group type melamine resin in which at least one of $(ROCH_2)_2N-$ groups in Formula (1) is substituted with a group represented by Formula (4).

[Chemical Formula 1]

Formula (1)

Formula (2)

Formula (3)

Formula (4)

For the blocked isocyanate, use may be made of a blocked isocyanate obtained by reacting an isocyanate group in a known isocyanate with a blocking agent. Exemplary isocyanates include organic polyisocyanates such as naphthalene diisocyanate, isophorone diisocyanate (IPDI), xylylene diisocyanate (XDI), hexamethylene diisocyanate (HMDI), tetramethylxylylene diisocyanate (TMXDI), dicyclohexylmethane diisocyanate (H12MDI), hydrogenated diphenylmethane diisocyanate (hydrogenated MDI), diphenylmethane diisocyanate (MDI) and tolylene diisocyanate (TDI), or biuret compounds thereof, isocyanurate compounds thereof and carbodiimide-modified products thereof, or mixtures of these.

Exemplary blocking agents include: phenols such as phenol, butylphenol, chlorophenol and phenylphenol; oximes such as methylethylketoxime, cyclohexane oxime and acetoxim; imidazoles such as imidazole, 2-methylimidazole, 2-ethylimidazole, 2-phenylimidazole, 2-undecylimidazole and 2-heptadecylimidazole; and bisulfites such as sodium bisulfite. Of these, sodium bisulfite is preferably used because it is easily dissociated at relatively low temperature in a short time. Bisulfites such as sodium bisulfite also have the function as a hydrophilic group introducing agent.

The blocked isocyanate may be used in the form of emulsion. The emulsion is obtained by, for example, emulsifying blocked isocyanate in water by means of a nonionic surfactant.

For the blocked isocyanate, blocked isocyanates having water solubility or water dispersibility as stated in (i) to (iii) below may be used.

(i) A blocked isocyanate having a sulfonate group or a salt thereof, as obtained by reacting a compound having a sulfonate group or a salt thereof as well as an active hydrogen-containing group (e.g., hydroxy group, primary amino group), such as taurine soda, with polyisocyanate to obtain a product and then reacting an isocyanate group remaining in the obtained product with the blocking agent.

(ii) A blocked isocyanate having a polyalkylene glycol chain, as obtained by reacting polyalkylene glycol such as polyethylene glycol with polyisocyanate to obtain a urethane prepolymer and then reacting a terminal isocyanate group of the obtained urethane prepolymer with the blocking agent.

(iii) A blocked isocyanate having a quaternary ammonium group, as obtained by reacting a compound having a tertiary amino group and an active hydrogen-containing group, such as N-methyldiethanolamine, with polyisocyanate to obtain a product, subsequently reacting an isocyanate group remaining in the obtained product with the blocking gent, and then quaternizing a tertiary amino group in the obtained product with a quaternizing agent.

Examples of the quaternizing agent include alkyl halide and diethyl sulfate.

For the epoxy compound, known epoxy compounds may be used. Specific examples thereof include sorbitol polyglycidyl ether, polyglycerol polyglycidyl ether, pentaerythritol polyglycidyl ether, diglycerol polyglycidyl ether, glycerol polyglycidyl ether, trimethylolpropane polyglycidyl ether, ethylene glycol diglycidyl ether, polyethylene glycol diglycidyl ether, propylene glycol diglycidyl ether and polypropylene glycol diglycidyl ether.

The amine refers to a compound in which at least one hydrogen atom in ammonia ($NH_3$) is each independently substituted with an alkyl group, an aminoalkyl group, an N-aminoalkyl-aminoalkyl group, N—[N-(aminoalkyl)aminoalkyl]aminoalkyl group or a hydroxyalkyl group, and known amines may be used. Specific examples thereof include ethylenediamine, diethylenetriamine, triethylenetetramine, tetraethylenepentamine, pentaethylenehexamine, hexamethylenediamine, monoethanolamine, diethanolamine and triethanolamine.

The polyhydric alcohol refers to a compound having two or more hydroxy groups, and known polyhydric alcohols may be used. Specific examples thereof include ethylene glycol, polyethylene glycol, propylene glycol, polypropylene glycol, glycerin, polyglycerin, pentaerythritol and polypentaerythritol.

The polyhydric phenol refers to an aromatic compound having two or more phenolic hydroxyl groups, and known polyhydric phenols may be used. Specific examples thereof include hexahydroxybenzene, pyrogallol, 1,2,4-trihydroxybenzene, phloroglucinol, catechol, resorcinol, hydroquinone, 5-methylpyrogallol, 2-methylresorcinol, 5-methylresorcinol, 2,5-dimethylresorcinol, 3-methylcatechol, 4-methylcatechol, methylhydroquinone, 2,6-dimethylhydroquinone, 5-methoxyresorcinol, 3-methoxycatechol, methoxyhydroquinone and 2,5-dihydroxy-1,4-benzoquinone.

The polyvalent carboxylic acid refers to a compound having two or more carboxyl groups, and known polyvalent carboxylic acids may be used. Specific examples thereof include oxalic acid, malonic acid, succinic acid, glutaric acid, adipic acid, fumaric acid, maleic acid, phthalic acid, isophthalic acid, terephthalic acid, aconitic acid, 1,2,3-propanetricarboxylic acid and 1,2,3,4-butanetetracarboxylic acid.

The hydroxycarboxylic acid refers to a compound having a hydroxy group and a carboxyl group, and known hydroxycarboxylic acids may be used. Specific examples thereof include glycolic acid, lactic acid, tartronic acid, glyceric acid, 2-hydroxybutyric acid, 3-hydroxybutyric acid, γ-hydroxybutyric acid, malic acid, tartaric acid, citramalic acid, citric acid, isocitric acid, leucic acid, mevalonic acid, pantoic acid, ricinoleic acid, ricinelaidic acid, cerebronic acid, quinic acid, shikimic acid, salicylic acid, creosotic acid, vanillic acid, pyrocatechuic acid, resorcylic acid, protocatechuic acid, gentisic acid, orsellic acid, gallic acid, mandelic acid, benzilic acid, atrolactic acid, melilotic acid, coumaric acid, umbellic acid, caffeic acid, ferulic acid and sinapinic acid.

For the phosphoric acid or phosphoric acid compound, known inorganic phosphoric acids, known phosphoric acid esters and the like may be used. Exemplary inorganic phosphoric acids include: phosphoric acids (orthophosphoric acids) and salts thereof; and condensed phosphoric acids such as metaphosphoric acid, polyphosphoric acid and ultra-phosphoric acid, and salts thereof. Exemplary phosphoric acid esters include monomethyl phosphate, dimethyl phosphate, ethyl phosphate, diethyl phosphate, monobutyl phosphate, dibutyl phosphate, starch phosphate, glucosephosphate and glucose-6-phosphate, and salts thereof. Examples of the salts include: ammonium salts; alkali metal salts such as lithium salts and sodium salts; and alkaline earth metal salts such as calcium salts and magnesium salts.

The polyvalent metal compound refers to a compound containing metal atoms forming divalent or higher valent ions.

For the polyvalent metal compound, use may be made of known inorganic compounds containing one type or two or more types of metal atoms selected from Mg, Al, Zr, Ti, W, Mo and V. Specific examples thereof include: magnesium salts and the like, such as bis(acetylacetonato)diaquamagnesium(II), magnesium benzoate, magnesium formate, magnesium oxalate, magnesium tungstate, magnesium metaniobate, magnesium molybdate, magnesium diphosphate, magnesium nitrate, magnesium sulfate, magnesium carbonate, magnesium hydroxide, magnesium fluoride, ammonium magnesium phosphate, magnesium hydrogen phosphate and magnesium oxide; aluminum salts and the like, such as aluminum monoacetylacetonate bis(ethyl acetonate), aluminum nitrate, aluminum sulfate, aluminum potassium sulfate, sodium aluminum sulfate, ammonium aluminum sulfate, aluminum phosphate, aluminum carbonate, aluminum oxide, aluminum hydroxide, aluminum oxide, aluminum fluoride, aluminum acetate, aluminum benzoate, aluminum citrate, aluminum gluconate, aluminum oxalate, aluminum tartrate and aluminum lactate; zirconium salts and the like, such as tetrakis(acetylacetonato)zirconium(IV), zirconium silicate, zirconium oxycarbonate, ammonium hexafluorozirconate(IV), potassium hexafluorozirconate(IV), basic zirconium carbonate, zirconium ammonium carbonate, zirconyl ammonium carbonate, zirconium nitrate, zirconyl nitrate, zirconium(IV) sulfate, zirconyl sulfate, hexafluorozirconic acid, zirconium oxyphosphate, zirconium pyrophosphate, zirconyl dihydrogen phosphate, zirconium fluoride and zirconyl acetate; titanium salts and the like or titanic acid salts and the like, such as oxydioxalate titanium diammonium, oxydioxalate titanium dipotassium, titanium(IV) oxysulfate, basic titanium phosphate, titanium(IV) bromide, metatitanic acid, zinc(II) metatitanate, aluminum(III) titanate, potassium metatitanate, metatitanium tricobalt(II), zirconium titanate, metatitanium triiron(III), copper(II) metatitanate, sodium titanate, neodymium(III) dititanate, barium metatitanate, bismuth(III) metatitanate, magnesium metatitanate, magnesium titanate, manganese(II) metatitanate, lanthanum(III) dititanate, lithium metatitanate, ammonium hexafluorotitanate(IV), potassium hexafluorotitanate(IV), titanium(III) sulfate, titanium(IV) sulfate, titanium chloride, titanium nitrate, titanyl sulfate, titanium(IV) fluoride, hexafluorotitanic acid, titanium lactate, peroxotitanic acid and titanium acetylacetonate; tungsten salts and the like or tungstic acid salts and the like, such as tungsten(VI) chloride, iron(III) tungstate oxide, tungsten dioxide, tungsten trioxide, metatungstic acid, ammonium metatungstate, sodium metatungstate, paratungstic acid, ammonium paratungstate, sodium paratungstate, zinc(II) tungstate, potassium tungstate, calcium tungstate, cobalt(II) tungstate, copper(II) tungstate, nickel tungstate, barium tungstate, magnesium tungstate, manganese(II) tungstate, lithium tungstate, phosphotungstic acid, ammonium phosphotungstate and sodium phosphotungstate; molybdenum salts and the like or molybdic acid salts and the like, such as molybdenum(VI) oxide, molybdenum(VI) oxide, zinc(II) molybdate, potassium molybdate, calcium molybdate, cobalt(II) molybdate, nickel(II) molybdate, barium molybdate, bismuth(III) molybdate, magnesium molybdate, lithium molybdate, lithium paramolybdate, phosphomolybdic acid, ammonium phosphomolybdate, sodium phosphomolybdate, molybdic acid, ammonium molybdate, ammonium paramolybdate and sodium molybdate; and vanadium salts and the like or vanadic acid salts and the like, such as vanadium oxide, iron(III) tetravanadate, vanadium oxyoxalate, vanadium pentaoxide, metavanadic acid, sodium pyrovanadate, sodium vanadate, ammonium metavanadate, sodium metavanadate, potassium metavanadate, vanadium trioxide, vanadium dioxide, vanadium oxysulfate, vanadium oxyacetylacetate, vanadium acetylacetate and phosphovanadomolybdic acid.

The foregoing crosslinking agents may be used alone or in combination of two or more.

Exemplary plasticizers include 2,2,4-trimethyl-1,3-pentanediol monoisobutyrate, diethylene glycol monobutyl ether acetate, ethylene glycol monobutyl ether, dipropylene glycol n-butyl ether, diethylene glycol dibutyl ether and dipropylene glycol monopropyl ether.

The pH of the underlying coating-forming agent is preferably in a range from not less than 3 to not more than 11 and more preferably in a range from not less than 6 to not more than 10. When the pH is in the foregoing ranges, the electrochemical cell packaging material 110 can have more excellent electrolyte resistance.

(Production of Underlying Coating-forming Agent)

The production method of the underlying coating-forming agent is not particularly limited. For instance, the underlying coating-forming agent can be produced by mixing the zirconium oxide (A) or a dispersion thereof, the phosphorus-containing compound (B), the acid-modified polyolefin resin (C), and optionally an additive(s) and/or a solvent(s), and then appropriately adjusting the pH of the mixture.

[Production Method of Underlying Coating Layer]

The underlying coating layer 113 is a coating formed from the underlying coating-forming agent described above. The formation method of the coating involves a step of contacting the underlying coating-forming agent with a surface of the metal layer 112 (contacting step) and a step of, after the contacting step, drying the surface of the metal layer 112 having been contacted with the underlying coating-forming agent, without rinsing with water (drying step). In the production method of the coating, the contacting step may be preceded by a pretreatment step in which the surface of the metal layer 112 is, for instance, degreased or pickled in advance.

(Contacting Step)

The contacting method of the underlying coating-forming agent and the surface of the metal layer 112 is not particularly limited as long as the underlying coating-forming agent can be brought into contact with the surface of the metal layer 112, and examples thereof include spray coating, dip coating, roll coating, curtain coating, spin coating, bar coating, and combinations thereof.

The contacting conditions of the underlying coating-forming agent is not particularly limited. For example, the temperature of the underlying coating-forming agent or the metal layer 112 is preferably in a range from not lower than 10° C. to not higher than 90° C. and more preferably in a range from not lower than 20° C. to not higher than 60° C. The temperature of not higher than 60° C. is preferable in economical point of view since use of such temperature can prevent waste of energy. The contacting time is suitably specified.

<Drying Step>

In the drying step following the contacting step, the surface of the metal layer 112 having been contacted with the underlying coating-forming agent is dried without being rinsed with water. The formation of the underlying coating layer 113 is completed through this step. As one drying condition, the peak metal temperature (PMT) of the metal layer 112 is preferably in a range from not lower than 50° C. to not higher than 250° C. The peak metal temperature of not lower than 50° C. is preferable because a solvent in the underlying coating-forming agent evaporates in a shorter time. The peak metal temperature of not higher than 250° C. is preferable in economical point of view because energy is not spent wastefully.

The drying method is not particularly limited, and examples thereof include those utilizing a batch drying furnace, a continuous drying furnace of hot air circulation type, a conveyor-type hot air drying furnace, and an electromagnetic induction heating furnace using an IH heater. The air volume, air velocity and other settings are arbitrarily specified.

(Underlying Coating Layer)

The underlying coating layer 113 can be obtained by the production method described above.

The coating amount of the underlying coating layer 113 is not particularly limited and is preferably in a range from not less than 100 mg/m² to not more than 5000 mg/m². The coating amount of the underlying coating layer 113 within the foregoing range leads to improvement in initial adhesion between the underlying coating layer 113 and the adhesive resin layer 114 as well as electrolyte resistance and insulating properties of the electrochemical cell packaging material 110. For these characteristics, the coating amount is more preferably in a range from not less than 200 mg/m² to not more than 3000 mg/m² and particularly preferably in a range from not less than 400 mg/m² to not more than 2000 mg/m².

The presence of the zirconium oxide (A) in the underlying coating layer 113 can be observed by analyzing the metal layer 112 having the thus-obtained underlying coating layer 113 by thin-film X-ray diffraction. More specifically, the metal layer having the underlying coating layer 113 is analyzed by thin-film X-ray diffraction (Xpert-MPD manufactured by PANalytical; wide-angle method; tube voltage and current: 45 kV-40 mA; scanning rate: 0.025°/sec), and the presence of the zirconium oxide (A) in the underlying coating layer 113 can be observed from the obtained diffraction pattern.

The presence of the phosphorus-containing compound (B) in the underlying coating layer 113 can be observed by extracting the components of the underlying coating layer 113 with a solvent (e.g., chloroform, DMSO) and subjecting the components to $^{31}$P-NMR measurement.

The presence of the acid-modified polyolefin resin (C) in the underlying coating layer 113 can be observed by IR measurement.

The underlying coating layer 113 thus obtained is provided between the metal layer 112 and the adhesive resin layer 114 to improve adhesion with each of these layers while improving corrosion resistance of the metal layer 112. In addition, the electrochemical cell packaging material of the invention in which the underlying coating layer 113 is formed between the metal layer 112 and the adhesive resin layer 114 has excellent electrolyte resistance.

Various layers in the electrochemical cell packaging material 110 according to this embodiment other than the underlying coating layer 113 are described below in detail.

[Adhesive Resin Layer]

The adhesive resin layer 114 is a layer disposed between the underlying coating layer 113 and the thermally adhesive resin layer 115.

The adhesive resin layer 114 contains, for example, an acid-modified polyolefin resin. For the acid-modified polyolefin resin, acid-modified polypropylene is favorable. Examples of the acid-modified polyolefin resin include a resin obtained by acid-modifying a polyolefin with an unsaturated carboxylic acid or an anhydride thereof. Preferably, the type of the acid-modified polyolefin resin is selected as appropriate in accordance with the type of resin used for the thermally adhesive resin layer 115.

The thickness of the adhesive resin layer 114 is not particularly limited.

The formation method of the adhesive resin layer 114 is not particularly limited, and known methods can be employed, examples of which include an extrusion molding method and a dispersion method.

To the adhesive resin layer 114, a butene component, an ethylene-propylene-butene copolymer, a noncrystalline ethylene-propylene copolymer, a propylene-α-olefin copolymer or the like may be added in an amount of 5% or more as needed.

[Thermally Adhesive Resin Layer]

The thermally adhesive resin layer 115 contains, for example, a polyolefin. For the polyolefin, polypropylene is favorable.

The polypropylene may include a repeating unit derived from α-olefin (e.g., ethylene) other than propylene, and examples of such a polypropylene include random polypropylene, block polypropylene, and polypropylenes of various types.

Exemplary polyolefins other than the polypropylene include linear low-density polyethylene, middle-density polyethylene, and a blended resin of linear low-density polyethylene and middle-density polyethylene. The middle-density polyethylene is polyethylene having a density of not less than 930 kg/m$^3$ but less than 942 kg/m$^3$. The linear low-density polyethylene is a polymer of ethylene and a small amount of α-olefin.

The thickness of the thermally adhesive resin layer 115 is not particularly limited.

The formation method of the thermally adhesive resin layer 115 is not particularly limited, and known methods can be employed, examples of which include an extrusion molding method and a dispersion method.

The thermally adhesive resin layer 115 may be constituted of a single layer or multiple layers. When the thermally adhesive resin layer 115 is multi-layered, the respective layers may contain the same or different polyolefins.

[Metal Layer]

The metal layer 112 is a layer for, in addition to enhancing the strength of the electrochemical cell packaging material 110, preventing water vapor from penetrating into the lithium-ion cell 121 from the outside through the base layer 111.

Exemplary metals constituting the metal layer 112 include aluminum, stainless steel and titanium, and aluminum is preferred.

The metal layer 112 may be metal foil or a layer formed by, for instance, metal vapor deposition, and preferred is metal foil, particularly aluminum foil. In order to prevent wrinkles or pinholes from occurring in the metal layer 112 during production of the packaging material, the use of soft aluminum foil such as annealed aluminum (JIS A8021P-O, JIS A8079P-O) is further preferred.

The metal layer 112 is not particularly limited in thickness as long as it functions as a barrier layer for blocking water vapor and the like, and the thickness is for instance ranges from about 10 μm to about 50 μm and preferably from about 10 μm to about 40 μm.

Examples of the aluminum foil used as the metal layer 112 include pure aluminum foil and iron-containing aluminum foil.

[Base Layer]

The base layer 111 is an outermost layer of the electrochemical cell packaging material 110. The material forming the base layer 111 is not particularly limited as long as it is an insulating material.

Examples of the material forming the base layer 111 include polyesters, polyamides, epoxy resins, acrylic resins, fluororesins, polyurethane resins, silicon resins, phenolic resins, polyetherimides, polyimides, and mixtures or copolymers thereof.

The polyester is not particularly limited as long as it is a polymer having an ester bond (—COO—) in the molecule, and examples thereof include polyethylene terephthalate, polybutylene terephthalate, polyethylene naphthalate, polybutylene naphthalate, copolymerized polyester and polycarbonate.

Exemplary polyamides include nylon 6, nylon 6,6, a copolymer of nylon 6 and nylon 6,6, nylon 6,10, and polymetaxylylene adipamide (MXD6).

The base layer 111 made of the foregoing material(s) can be formed by coating a treatment agent containing the material(s) on a surface of the metal layer 112.

The base layer 111 may be a resin film containing the foregoing material(s) or a resin film formed by uniaxially- or biaxially-stretching that film. In particular, the base layer 111 is preferably a biaxially-stretched resin film because its oriented crystallization brings about improved heat resistance.

When the base layer 111 is the resin film as above, the base layer 111 can be disposed on the metal layer 112 by bonding or sticking the base layer 111 onto the surface of the metal layer 112.

The base layer 111 may be a laminate formed by laminating films made of different materials in order to improve pinhole resistance as well as, in the case of using the electrochemical cell packaging material 110 for a packaging member of a cell, improving insulating properties of the packaging member.

While the lithium-ion cell 121 is described with reference to FIGS. 2 and 3, an electrochemical cell other than the lithium-ion cell 121 may be produced by packing an electrochemical cell module other than the lithium-ion cell module 122 with the packaging member 120 formed from the electrochemical cell packaging material 110.

Exemplary electrochemical cells include, in addition to lithium-ion cells, chemical cells such as nickel-hydride cells, nickel-cadmium cells, lithium-metal primary or secondary cells, and lithium-polymer cells, capacitors such as electric double-layer capacitors and lithium-ion capacitors, and electrolytic capacitors. An electrochemical cell module includes all electric device elements for generating electric energy, namely a cell (electric power storage portion) including a cathode composed of a cathode active material and a cathode charge collector, an anode composed of an anode active material and an anode charge collector, and electrolyte liquid which fills between the cathode and the anode, electrode terminals coupled to the cathode and the anode inside the cell, and other components, which are to be packed by an electrochemical cell packaging material.

The present invention is not limited to the foregoing embodiments and can be variously modified; such embodiments as obtained by suitably combining technological means disclosed in different embodiments also fall within the scope of the invention.

EXAMPLES

The invention is described below in further detail with examples and comparative examples. However, the invention should not be construed as being limited to the following examples.

[1. Production of Underlying Coating Layer-Carrying Aluminum Foil]

Components shown in Table 1 were added to water serving as a solvent and mixed, whereafter the pH of the mixture was adjusted with ammonia or acetic acid, thereby preparing each underlying coating-forming agent shown in Table 1. The "pH" in Table 1 represents the pHs of the underlying coating-forming agents.

Subsequently, a piece of aluminum foil (thickness: 40 μm) was coated on its one surface with each underlying coating-forming agent shown in Table 1 by bar coating using a SUS wire bar. Then, the piece of aluminum foil coated with the underlying coating-forming agent was dried at 180° C. for 1 minute. Thus, pieces of underlying coating layer-carrying aluminum foil, that is, pieces of aluminum foil each having formed thereon the relevant underlying coating layer shown in Table 2, were produced.

The "Concentration (%)" columns in Table 2 represent the contents (mass %) of the components with respect to the total solids of the relevant underlying coating layer. The concentrations of zirconium compounds (a), phosphorus-containing compounds (b) and water-soluble or water-dispersible resins (c) in the underlying coating-forming agents shown in Table 1 were suitably adjusted to form predetermined underlying coating layers. Table 2 also shows the ratio (P/Zr) of the total molar quantity of phosphorus atoms (P) in a phosphorus-containing compound (b) to the total molar quantity of zirconium atoms (Zr) in a zirconium compound (a) as well as the coating amount (g/m$^2$) of each underlying coating layer.

<Zirconium Compound (a)>

The types of zirconium compounds corresponding to the reference signs stated in the "(a) Component" column in Table 1 are described below. Note that the average particle sizes of zirconium oxide sols of a1 to a3 are values measured with a dynamic light scattering spectrophotometer (DLC-6500) manufactured by Otsuka Electronics Co., Ltd.

a1: Zirconium(IV) oxide sol (solid content: 20 mass %; average particle size: 30 nm)

a2: Zirconium(IV) oxide sol (solid content: 15 mass %; average particle size: 250 nm)

a3: Zirconium(IV) oxide sol (solid content: 25 mass %; average particle size: 1 μm)

a4: Zirconium acetate (solid content: 20 mass %)

a5: Zirconium ammonium carbonate (solid content: 31 mass %)

<Phosphorus-Containing Compound (b)>

The types of phosphorus-containing compounds corresponding to the reference signs stated in the "(b) Component" column in Table 1 are described below.

b1: Phytic acid [$C_6H_{18}O_{24}P_6$]

b2: Ethylenediamine tetra(methylene phosphonic acid) [$C_6H_{20}N_2O_{12}P_4$]

b3: Ammonium phosphate [$(NH_4)_3PO_4$]

b4: Hydroxyethylidenediphosphonic acid [$C_2H_8O_7P_2$]

<Water-Soluble or Water-Dispersible Resin (c)>

The types of water-soluble resins or water-dispersible resins corresponding to the reference signs stated in the "(c) Component" column in Table 1, as well as production methods of those resins, are described below.

(c1: Acid-Modified Polypropylene Resin)

Homopolypropylene resin of the isotactic structure (MRF=0.1 g/10 min-170° ° C.2160 g) was, while being supplied with nitrogen gas, heat-decomposed at 360° C. for 80 minutes at normal pressure. The resulting polypropylene resin (1000 parts by mass) was heated to 180° C. and melted in nitrogen gas, whereafter 125 parts by mass of maleic anhydride was added thereto and mixed. To the mixture, 125 parts by mass of xylene having 6.3 parts by mass of dicumyl peroxide dissolved therein was added dropwise and reacted with stirring at 180° C. for 3 hours. Subsequently, xylene was distilled off under reduced pressure, and the resulting reaction product was poured into acetone to solidify the resin, which was thereafter collected. The resin was finely cut up and then processed to a pellet form. The processed resin was washed with acetone twice and dried under reduced pressure to thereby obtain acid-modified polypropylene resin. Thereafter, 150.0 parts by mass of the acid-modified polypropylene resin, 60.0 parts by mass of isopropanol, 340.0 parts by mass of tetrahydrofuran, 30.0 parts by mass of dimethylaminoethanol and 420.0 parts by mass of distilled water were stirred at 300 rpm to maintain the state where sedimentation of the resin was not observed (suspending state). After 10 minutes, the mixture was heated and further stirred at 150° C. for 60 minutes, and then naturally cooled down. To the stirred product having been cooled to 80° C., 120.0 parts by mass of tetrahydrofuran, 20.0 parts by mass of dimethylaminoethanol and 100.0 parts by mass of distilled water were additionally poured, whereafter the mixture was again heated (again increased in temperature) with stirring at 300 rpm and stirred at 140° C. for 60 minutes. Subsequently, the mixture was cooled to 80° C., and then isopropanol, tetrahydrofuran and water were distilled off under reduced pressure with a vacuum pump. Thereafter, the residual (acid-modified polypropylene resin) was cooled to 35° C., and water was added thereto to adjust the concentration of the acid-modified polypropylene resin to 20 mass %. The aqueous dispersion having the acid-modified polypropylene resin dispersed therein was filtered under pressure with a 180 mesh filter made of stainless steel, thereby obtaining an aqueous emulsion of the acid-modified polypropylene resin.

(c2: Acrylic Resin)

At room temperature, 210 parts by mass of isopropyl alcohol, 120 parts by mass of N-methylolacrylamide and 30 parts by mass of acrylamide were mixed into 390 parts by mass of ion exchanged water and dissolved therein. To the mixture, 1.5 parts by mass of potassium persulfate, 0.06 parts by mass of sodium hydrogen sulfite and 1.5 parts by mass of anhydrous sodium acetate were added and dissolved. This solution was heated to 65° C. over 30 minutes in a nitrogen atmosphere and reacted at 65° C. for 3 hours. The reaction product was cooled to room temperature and then filtered to collect a filtrate. The aqueous acrylic resin solution collected as the filtrate had a concentration of non-volatile content of 20 mass %, a viscosity of 2.86 dPa·s, and a pH of 5.6.

(c3: Elastomer)

For elastomer, an aqueous dispersion of acrylonitrile butadiene styrene rubber having carboxyl groups and methylol groups (solid concentration: 47%; pH: 8; viscosity: 45 mPa-s; Tg: 18° C.; specific gravity: 1.01) was used.

(c4: Epoxy Resin)

In a nitrogen atmosphere, 6150 parts by mass of bisphenol A epoxy resin (bisphenol-A-diglycidyl-ether) having an epoxy equivalent of 188, 1400 parts by mass of bisphenol A, 335 parts by mass of dodecylphenol, 470 parts by mass of p-cresol and 441 parts by mass of xylene were heated to 125° C. and reacted for 10 minutes. Next, the reaction product was heated to 130° C., and 23 parts by mass of N,N-dimethylbenzylamine was added thereto. This temperature was maintained until the epoxy equivalent reached 880. Subsequently, 90 parts by mass of polyether (manufactured by BYK Chemie; commercial name: K-2000) was further added to the reaction product, and the resulting mixture was stored at 100° C. After 30 minutes, 211 parts by mass of butyl alcohol and 1210 parts by mass of isobutanol were added to the mixture.

Diethylenetriamine and methyl isobutyl ketone were mixed and heated to reflux at a temperature from 130° C. to 150° C. to remove produced water, thereby separately obtaining ketimine.

To the mixture containing the butyl alcohol, the isobutanol and other components, 467 parts by mass of the obtained ketimine and 450 parts by mass of methylethanolamine were added, and the temperature of the mixture was adjusted to 100° C. After 30 minutes, the temperature was raised to 105° C., and 80 parts by mass of N,N-dimethylaminopropylamine was further added to the mixture. After the elapse of 75 minutes following addition of the N,N-dimethylaminopropylamine, 903 parts by mass of propylene glycol compound (manufactured by BASF; commercial name: Plastilit 3060) and 725 parts by mass of propylene glycol phenyl ether were sequentially added to the mixture to produce amino group-containing epoxy resin. Then, 87.5 parts by mass of the amino group-containing epoxy resin and 13 parts by mass of 10% acetic acid were blended to obtain a mixture, whereafter, while 193.5 parts by mass of deionized water was strongly stirred, the mixture was added dropwise to the deionized water over about 15 minutes, thereby obtaining an emulsion of epoxy resin.

[2. SEM Observation of Surface of Underlying Coating Layer]

For the underlying coating layer 1 and the underlying coating layer 3 in the pieces of underlying coating layer-carrying aluminum foil produced, their surfaces were observed with FE-SEM (manufactured by Hitachi High-Technologies Corporation; S-4700, Type II), and the particle sizes (the particle size refers to the long diameter if there are the long diameter and the short diameter) of zirconium oxides in the underlying coating layer 1 and the underlying coating layer 3 were found to be not more than 500 nm. In other words, zirconium oxide exceeding 500 nm in size was not found. The surface observation was carried out at an acceleration voltage of 2 kV and a magnification of 5000× in dozen fields of view (1-cm square) randomly selected.

[3. Electrochemical Cell Packaging Material]

For each of the foregoing pieces of underlying coating layer-carrying aluminum foil, molten acid-modified polypropylene was extruded (to a thickness of 20 µm) onto the top surface of the underlying coating layer, and then molten polypropylene was extruded (to a thickness of 15 µm) thereon, thereby obtaining an electrochemical cell packaging material constituted of the aluminum foil layer/the underlying coating layer/the acid-modified polypropylene layer/the polypropylene layer.

[4. Evaluation of Lamination Strength after Immersion into Electrolyte Liquid (Electrolyte Resistance)]

Each electrochemical cell packaging material was cut to form a specimen of 15 mm×250 mm, and the specimen was dipped in electrolyte liquid (commercial name: LBG-00015 (manufactured by Kishida Chemical Co., Ltd.); electrolyte: IM-LiPF$_6$; solvent: ethylene carbonate/diethyl carbonate/dimethyl carbonate=1/1/1 (volume ratio)) to which 1000 ppm of ion exchanged water had been added, at 85° C. for 2 weeks. Thereafter, a tension was applied between the aluminum foil and the acid-modified polypropylene layer to separate them in a 180-degree direction with a chuck-to-chuck distance of 50 mm and a tensile rate of 300 mm/min with a tensile tester (manufactured by Shimadzu Corporation; AGS-50D (commercial name)). Thus, the strength in separation was measured. The measurement results were rated according to the ranks 1 to 4 below. The measurement results are shown in Table 3. The rank 3 and higher rank are acceptable levels.

Rank 4: The lamination strength was not less than 10 N/15 mm.

Rank 3: The lamination strength was not less than 6 N/15 mm but less than 10 N/15 mm.

Rank 2: The lamination strength was not less than 3 N/15 mm but less than 6 N/15 mm.

Rank 1: Separation had already occurred in a laminate film constituted of an acid-modified polypropylene layer and a polypropylene layer, or the lamination strength was less than 3 N/15 mm.

[5. Evaluation of Water Vapor Barrier Properties]

Each electrochemical cell packaging material was cut to form a specimen of 120 mm×120 mm, and the specimen was folded in half. One of the opposite sides with a length of 60 mm as a result of folding in half was heat-sealed with a heat-sealing width of 3 mm. In addition, a portion where two 120-mm sides lie together as a result of folding in half was heat-sealed with a heat-sealing width of 10 mm, and then, of this heat-sealed portion, a 7 mm-wide portion was cut off. Thus, made was a bag having an outer size of 120 mm×53 mm with the non-sealed 60-mm side being open. Next, 3 g of electrolyte liquid solvent [ethylene carbonate/diethyl carbonate/dimethyl carbonate=1/1/1 (volume ratio)] was poured into the bag in a dry room (dew point: −50° C.), and the open side was heat-sealed with a heat-sealing width of 10 mm. Thus, a water vapor barrier property evaluation sample was prepared. This water vapor barrier property evaluation sample was allowed to stand in a constant temperature and humidity bath at 65° C. and 90% RH for 336 hours, and increased moisture concentration (ppm by mass) of the electrolyte liquid solvent was measured by the Karl Fischer method. The measurement result was rated according to the ranks 1 to 3 below. Note that the heat-sealing conditions for the portion where the 120-mm sides lie together were 190° C., 2.0 MPa and 3.0 seconds, and those for the 60-mm sides were 190° C., 1.0 MPa and 3.0 seconds. The measurement results are shown in Table 3. The rank 2 and higher rank are acceptable levels.

Rank 3: Increased moisture concentration was not more than 150 ppm by mass.

Rank 2: Increased moisture concentration was more than 150 ppm by mass but not more than 200 ppm by mass.

Rank 1: Increased moisture concentration was more than 200 ppm by mass.

[6. Evaluation of Insulating Properties]

Each electrochemical cell packaging material was cut to form a specimen of 40 mm×120 mm, and then, with a metal wire (inner diameter: 25.4 μm) being sandwiched between an aluminum tub (30 mm×100 mm) and the polypropylene layer-side surface of the electrochemical cell packaging material, a heat-sealing bar was continuously pressed against the sandwiched portion at 1.0 MPa and 190° C. At this time, the time taken until the wire had dug into the acid-modified polypropylene layer and the polypropylene layer due to the pressing by the heat-sealing bar and the insulating properties between the aluminum tub and the aluminum foil layer of the electrochemical cell packaging material had decreased, was measured. The time taken until the insulating properties had decreased refers to the time from when application of 100 V voltage between the aluminum tub and the aluminum foil layer of the electrochemical cell packaging material was started simultaneously with start of the heat-sealing until the resistance reached 200 MΩ or a lower value (reaching time; sec). The reaching time was rated according to the ranks 1 to 4 below. The measurement results are shown in Table 3. The rank 3 and higher rank are acceptable levels.

Rank 4: The reaching time was not less than 60 seconds.

Rank 3: The reaching time was not less than 30 seconds but less than 60 seconds.

Rank 2: The reaching time was not less than 5 seconds but less than 30 seconds.

Rank 1: The reaching time was less than 5 seconds.

TABLE 1

| Underlying coating-forming agent No. | (a) Component | (b) Component | (c) Component | pH |
|---|---|---|---|---|
| 1 | a1 | b1 | c1 | 9 |
| 2 | a1 | b2 | c1 | 8.5 |
| 3 | a2 | b1 | c1 | 9 |
| 4 | a1 | b1 | c1 | 9 |
| 5 | a1 | b2 | c1 | 8.5 |
| 6 | a1 | b2 | c1 | 8.5 |
| 7 | a1 | b1 | c1 | 9 |
| 8 | — | b1 | c1 | 9 |
| 9 | a1 | — | c1 | 8.3 |
| 10 | a1 | b1 | — | 9 |
| 11 | a4 | b1 | c1 | 9.4 |
| 12 | a5 | b1 | c1 | 9 |
| 13 | a1 | b3 | c1 | 8.5 |
| 14 | a1 | b4 | c1 | 8.3 |
| 15 | a2 | b1 | c2 | 8.3 |
| 16 | a2 | b1 | c3 | 9.1 |
| 17 | a1 | b1 | c4 | 9 |
| 18 | a3 | b1 | c1 | 9 |

TABLE 2

| Underlying coating layer No. | Underlying coating-forming agent No. | (a) Component Concentration (%) | (b) Component Concentration (%) | (P/Zr) | (c) Component Concentration (%) | Coating amount (g/m$^2$) |
|---|---|---|---|---|---|---|
| 1 | 1 | 29.4 | 5.4 | 0.21 | 65.2 | 0.50 |
| 2 | 2 | 14.6 | 7.7 | 0.60 | 77.7 | 0.50 |
| 3 | 3 | 29.4 | 5.4 | 0.21 | 65.2 | 0.50 |
| 4 | 4 | 32.3 | 2.5 | 0.09 | 65.2 | 0.50 |
| 5 | 5 | 53.6 | 21.6 | 0.21 | 24.8 | 0.50 |
| 6 | 6 | 3 | 1.6 | 0.60 | 95.4 | 0.50 |
| 7 | 7 | 29.4 | 5.4 | 0.21 | 65.2 | 0.09 |
| 8 | 8 | 0 | 25.1 | — | 74.9 | 0.50 |
| 9 | 9 | 25.3 | 0 | — | 74.7 | 0.50 |
| 10 | 10 | 84.5 | 15.5 | 0.21 | 0 | 0.50 |
| 11 | 11 | 20.3 | 10.4 | 0.22 | 69.3 | 0.50 |
| 12 | 12 | 25.5 | 7.6 | 0.13 | 66.9 | 0.50 |
| 13 | 13 | 31.1 | 5 | 0.20 | 63.9 | 0.50 |
| 14 | 14 | 25 | 5 | 0.12 | 70 | 0.50 |
| 15 | 15 | 29.4 | 5.4 | 0.21 | 65.2 | 0.50 |
| 16 | 16 | 29.4 | 5.4 | 0.21 | 65.2 | 0.50 |
| 17 | 17 | 29.4 | 5.4 | 0.21 | 65.2 | 0.50 |
| 18 | 18 | 29.4 | 5.4 | 0.21 | 65.2 | 0.50 |

TABLE 3

| Electrochemical cell packaging material | Underlying coating layer No. | Electrolyte resistance | Water vapor barrier properties | Insulating properties |
|---|---|---|---|---|
| Example 1 | 1 | 4 | 3 | 4 |
| Example 2 | 2 | 4 | 3 | 4 |

TABLE 3-continued

| Electrochemical cell packaging material | Underlying coating layer No. | Electrolyte resistance | Water vapor barrier properties | Insulating properties |
|---|---|---|---|---|
| Example 3 | 3 | 3 | 3 | 4 |
| Example 4 | 4 | 3 | 3 | 4 |
| Example 5 | 5 | 4 | 2 | 4 |
| Example 6 | 6 | 3 | 3 | 4 |
| Example 7 | 7 | 3 | 3 | 3 |
| Comparative example 1 | 8 | 1 | 3 | 3 |
| Comparative example 2 | 9 | 1 | 3 | 4 |
| Comparative example 3 | 10 | 4 | 1 | 3 |
| Comparative example 4 | 11 | 1 | 3 | 3 |
| Comparative example 5 | 12 | 1 | 3 | 3 |
| Comparative example 6 | 13 | 2 | 3 | 4 |
| Comparative example 7 | 14 | 2 | 3 | 4 |
| Comparative example 8 | 15 | 3 | 1 | 4 |
| Comparative example 9 | 16 | 4 | 1 | 4 |
| Comparative example 10 | 17 | 3 | 1 | 2 |
| Comparative example 11 | 18 | 2 | 3 | 4 |

As shown in Table 3, it was revealed that the electrochemical cell packaging materials of Examples 1 to 7 had sufficient insulating properties while having excellent electrolyte resistance and water vapor barrier properties.

REFERENCE SIGNS LIST 110, 210 electrochemical cell packaging material
111, 211 base layer
112, 212 metal layer
113 underlying coating layer
114 adhesive resin layer
115, 215 thermally adhesive resin layer
120, 220 packaging member
121, 221 lithium-ion cell
122, 222 lithium-ion cell module
124, 224 metal terminal

The invention claimed is:

1. An electrochemical cell packaging material having a metal layer, an adhesive resin layer and a thermally adhesive resin layer that are stacked in this order, the electrochemical cell packaging material comprising:
    an underlying coating layer disposed between the metal layer and the adhesive resin layer,
    wherein the underlying coating layer at least contains a zirconium oxide (A) having an average particle size in a range from not less than 1 nm to not more than 500 nm, one or more phosphorus-containing compounds (B) selected from the group of phosphorus compounds each having four or more phosphonic groups in a molecule, and an acid-modified polyolefin resin (C).

2. The electrochemical cell packaging material according to claim 1,
    wherein a content of the zirconium oxide (A) is in a range from not less than 3 mass % to not more than 54 mass % with respect to total solids of the underlying coating layer.

3. The electrochemical cell packaging material according to claim 1,
    wherein a content of the acid-modified polyolefin resin (C) is in a range from not less than 24 mass % to not more than 96 mass % with respect to total solids of the underlying coating layer.

4. The electrochemical cell packaging material according to claim 2,
    wherein a content of the acid-modified polyolefin resin (C) is in a range from not less than 24 mass % to not more than 96 mass % with respect to total solids of the underlying coating layer.

5. The electrochemical cell packaging material according to claim 1, wherein a ratio (P/Zr) of a total molar quantity of phosphorus atoms (P) in the one or more phosphorus-containing compounds (B) to a total molar quantity of zirconium atoms (Zr) in the zirconium oxide (A) is in a range of from not less than 0.01 to not more than 5.0.

6. The electrochemical cell packaging material according to claim 1, wherein the one or more phosphorus-containing compounds (B) include one or more selected from the group consisting of phytic acid, ethylenediamine tetra(methylene phosphonic acid), and salts thereof.

* * * * *